United States Patent [19]

Plamquist

[11] 4,125,755
[45] Nov. 14, 1978

[54] LASER WELDING

[75] Inventor: John M. Plamquist, Plainsboro, N.J.

[73] Assignee: Western Electric Co., Inc., New York, N.Y.

[21] Appl. No.: 809,212

[22] Filed: Jun. 23, 1977

[51] Int. Cl.² ............................................... B23K 9/02
[52] U.S. Cl. ........................... 219/121 L; 219/121 LM
[58] Field of Search ............................. 350/6; 355/57; 219/121 L, 121 LM

[56] References Cited

U.S. PATENT DOCUMENTS

| | | | |
|---|---|---|---|
| 3,273,446 | 9/1966 | Goetz et al. ............................... | 350/6 |
| 3,588,440 | 6/1971 | Morse ............................ | 219/121 LM |
| 3,973,825 | 12/1974 | Starkweather ............................ | 350/6 |
| 3,998,540 | 12/1976 | Weinstein ............................... | 355/57 |

*Primary Examiner*—J. V. Truhe
*Assistant Examiner*—Fred E. Bell
*Attorney, Agent, or Firm*—M. Pfeffer

[57] ABSTRACT

A beam welding apparatus useful for welding a plurality of workpieces spaced along a workpiece plane during a scan of the workpieces is disclosed. A scan light and a detection means are used to detect the location of each workpiece and to supply a signal for triggering a beam source into emission upon the detection of each workpiece. The beam and scan light sources are focused on the workpieces through the same focusing lens. Further, the apparatus comprises means for maintaining a constant optical path between the lens and each workpiece that includes a translating means for moving a moveable mirror, that is disposed between the lens and the workpieces, along a path coincident with the lens axis so as to effect consistent welds during an uninterrupted scan.

11 Claims, 2 Drawing Figures

LASER WELDING

BACKGROUND OF THE INVENTION

1. Field of the Invention

This invention relates to laser techniques for effecting high volume welding of workpieces and more particularly, in a preferred embodiment, to apparatus and methods for maintaining a constant optical path between a focusing lens, associated with a processing laser, and a succession of fixed workpieces, so as to produce a constant light spot size during a scan of the workpieces.

2. Description of the Prior Art

In prior art laser welding apparatus, it is well known to use light scan systems to locate parts spaced along a workpiece plane by detecting the light reflected from the parts to initiate triggering of a high-power pulse, or Q-switched high-power laser. Various optic arrangements, electrical control, and mechanical motion strategies and combinations thereof have been employed to develop efficient automatic, production line, welding systems to effect proper welds.

One method for automatic welding of parts is described in British Pat. No. 1,153,282 dated May 29, 1969. There, a system is described that scans, by a search-scan technique, a workpiece in the form of a pair of wires wherein it is assumed that the two wires touch one another at one point. An object of the search scan is to locate this point where the wires touch.

A light detection means responsive to light reflections from the wires provides a two-pulse signal indicative of light reflections from both wires, and a one-pulse signal upon the reflection of light from the point where both wires touch. Means responsive to the single pulse signal is provided for arresting the scan and initiating the welding of the workpiece at the detected point.

This method for automatic welding, however, does require the search-scan process to be interrupted in order to effect a weld. The interruption of the scan appears to be an inefficient procedure for welding a large array of workpieces spaced along the workpiece plane since considerable time could be consumed.

Another method for automatically welding of parts is described in U.S. Pat. No. 3,485,996 issued Dec. 23, 1969, to Chiou et al. There, a laser welding device is used to connect an integrated chip to a substrate. A chip lead is positioned adjacent to a substrate land and a decal having a gold strip is positioned over both the lead and the land. The decal strip has a conductive gold line which accurately overlaps, for example, one of the substrate lands and one of the chip leads.

For welding to the substrate, the assembly is passed under an optic-laser system so that the strip overlaying the substrate land may be positioned at the focal point location and automatically welded. A high intensity light is directed at the focal point location or target past which the gold strip or connector overlaying the land of the substrate is moved. The light impinges on the gold strip and reflects onto a light detecting means. The light detecting means provides a signal for triggering into emission a processing laser that is focused at the focal point location or target to effect the weld.

The moving of a series of substrates with the chip and decal attached under an optic-laser system appears to reduce the efficiency of an automatic welding operation since the chip leads must be sufficiently affixed to the substrate by the decal or other means to sustain any disruption of the connections during transit.

A further apparatus for laser welding during a scan might provide means for welding a plurality of fixed workpieces spaced along a workpiece plane. Such a system may include several workpiece planes on a rotary turntable, the turntable being intermittently indexed to step each workpiece plane under a processing laser. Such a system would require a search scan beam to be moved over the workpiece plane. Such a system might include a rotating mirror positioned between a focusing lens and the workpieces for deflecting both the scanning and processing beams over the workpiece plane.

However, the use of a rotating mirror creates a problem in that the optical paths between the lens and each workpiece would vary over the course of a scan, resulting in a different size weld at each workpiece location.

It should also be recognized that in precision welding systems, of the type wherein the tolerances of the weld zones are of the same order of magnitude as the laser spot size, the use of numerical controlled techniques, or tape controllers for indexing workpieces would be impractical. Manual repositioning would be a requirement to account for variations and tolerances of parts.

BRIEF SUMMARY OF THE INVENTION

The present invention is concerned with methods and apparatus for welding a plurality of workpieces spaced along a workpiece plane. The beam paths of a processing beam source and a scan light beam source are aligned substantially along the principal axes of a focusing lens. A moveable mirror is positioned with respect to the workpiece plane at a location along the principal axis of the lens such that the processing and scan light beams paths are reflected onto the workpiece plane. When the moveable mirror is translated coincident with the principal axis of the lens, the beam paths are reflected onto the workpieces and a constant optical path between the lens and each workpiece is maintained causing a constant size light spot to impinge upon each workpiece. The scan light reflected from each workpiece during the advancing of the moveable mirror over the plane is utilized to trigger the process beam source into emission to weld the detected workpiece.

DETAILED DESCRIPTION

Figure 1:
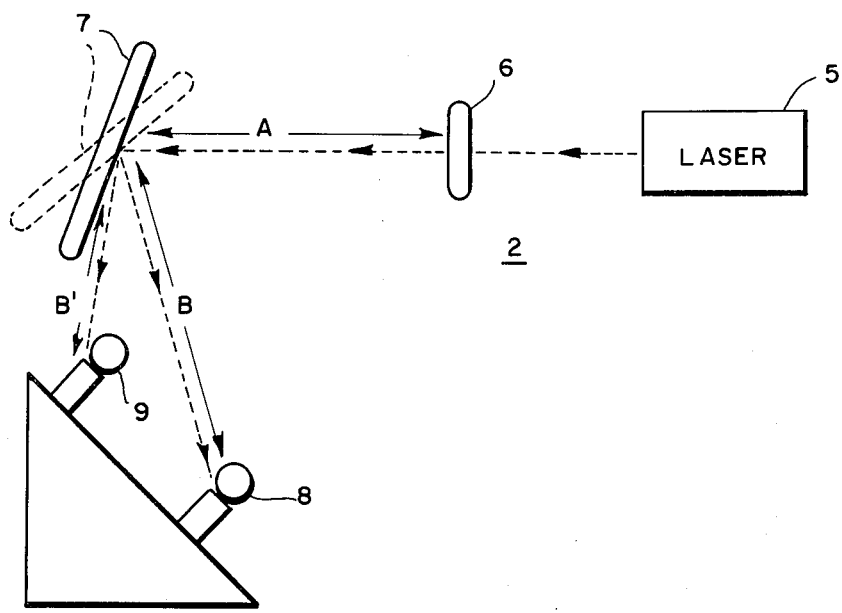
FIG. 1 is a basic laser welding apparatus that includes a rotating mirror.

Referring to the drawing, there is shown in FIG. 1 a basic laser welding apparatus that includes a rotating mirror 7. Light energy from processing laser 5 is focused through lens 6 to a first spot size on workpiece 8, when mirror 7 is positioned at the location shown by the solid lines. However, when mirror 7 is rotated to the location indicated by the dotted lines, light energy from laser 5 is focused to a second spot size on workpiece 9. The second spot size differs from the first spot size because the distance B' differs from distance B. The distances A plus B, and A plus B', from lens 6 to each of the respective workpiece locations differ, resulting in the formation of different size welds on the workpieces.

Figure 2:
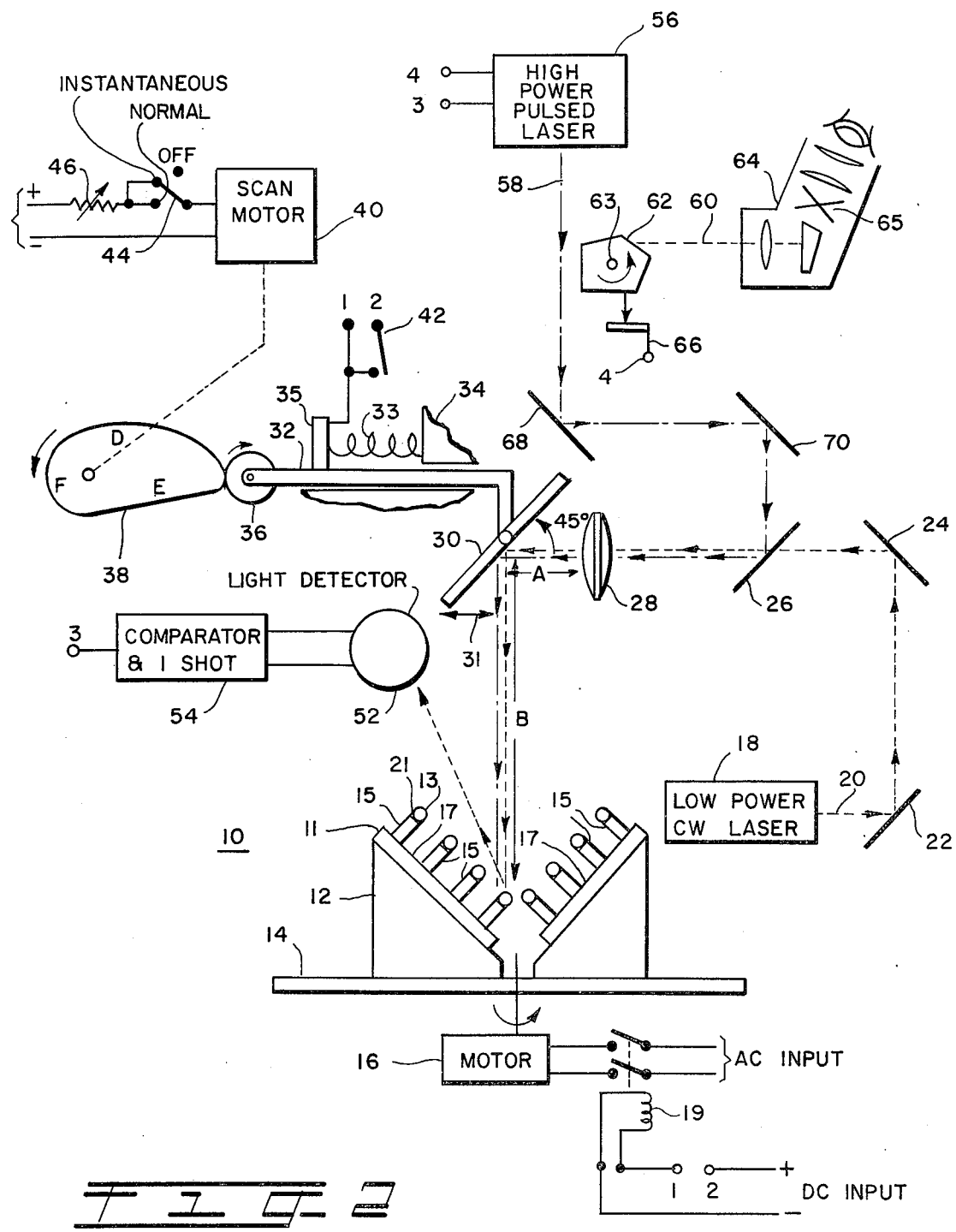
FIG. 2 is a block diagram representation of a preferred embodiment of the invention.

To provide a consistent weld size on each workpiece, a preferred embodiment of a laser welding apparatus is depicted in FIG. 2. Illustratively, each workpiece comprises a copper wire 13 having a diameter of 0.025 cm, in engagement with a brass terminal 15 having a diameter approximately 0.1 cm and providing a circular weld region or target 21 of about 0.09 cm diameter.

Each terminal is mounted on terminal board 17, serving as a workpiece plane, that has a surface which tends to absorb rather than reflect light. Board 17 is disposed on a holding fixture 12 which has a surface inclined to receive impinging light beams at approximately a 45° angle from a pair of lasers 18 and 56 so that weld regions 21—21 are fully exposed to a processing beam 58.

A low powered continuous wave (CW) laser 18, for example, a helium-neon laser operating at a wavelength of 632.8 nm and a power level of 1.5 mW, constitutes a scan light beam source. Laser 18 provides a continuous wave light beam 20 which is reflected by a first front surface mirror 22 such that the reflected beam 20 impinges upon a second front surface mirror 24. Beam 20 is further reflected by mirror 24 towards beam splitter 26. Beam splitter 26 provides, for example, approximately 99% reflectance of light at a wavelength of 1060 nm and approximates 80% transmission of light at wavelengths of 632.8 nm. Beam 20 enters beam splitter 26 and then enters focusing lens 28 where beam 20 is made convergent to converge to a focus spot on workpiece 11 after being reflected off of a moveable mirror 30. Lens 28, a conventional focusing lens, has a focal length equal to, illustratively, 6 inches. Mirror 30 is inclined at a 45° angle relative to the incidence beam and is moveable in the directions as shown by arrow 31 along a path coincident with the principal axis of lens 28. A mechanism, to be described later, is used to move mirror 30 in the directions shown relative to the inclination of the holding fixture 12 such that any increase or decrease in distance A between lens 28 and mirror 30 is complemented by a corresponding decrease or increase, respectively, in distance B between mirror 30 and each weld region 21, to maintain the total distance C between lens 28 and each weld region 21 at approximately 6 inches, the weld regions being located a short distance in front of the focal point of lens 28. The mirror movement functions in accordance with the following equation for maintaining the distance C substantially equal to the focal length ($f$):

$$f = C = A + B \qquad (1)$$

where $$A > B; \; A < B; \; A = B \qquad (2)$$

The light of beam 20, that is reflected off of each wire 13, is sensed by light detector 52 which is, illustratively, a conventional photodiode. Detector 52 converts the reflected light energy into an electrical signal. Detector 52 is coupled to a pulse signal generator circuit 54 comprising, for example, a conventional comparator and one-shot network, that utilizes the electrical signal to develop a suitable electrical output at terminal 3 to trigger a high-powered pulsed laser 56 into emission, in response to the detection of each workpiece spaced along the workpiece plane.

High-powered pulsed laser 56, illustratively an yttrium aluminum garnet (YAG) laser, operating at a wave length of 1060 nm, developing 150 watts at a rate of 10 pulses per second, constitutes a processing beam source. Laser 56 provides a beam 58 for the pulse radiations that are emitted when laser 56 is triggered. Beam 58 is deflected by a first prism 68 towards a second prism 70 and then deflected by prism 70 towards beam splitter 26. Beam 58 emerges from beam splitter 26 along the principal optical axis of focusing lens 28. Beam 58 intercepts moveable mirror 30 and then reflects towards workpiece 11 and terminates at the weld region 21 whereat welding takes place.

Both beams 20 and 58 are aligned substantially along the principal axis of lens 28, but beam 58 is slightly spatially separated from path 20 as will be explained infra.

Beam adjustment circuit 60, comprising a conventional telescope 64, a pentahedron prism 62, and an interlock switch circuit 66 coupled to laser 56 through terminal 4, is used to align beam 58 along the principal axis of lens 28 and to offset beam 20 such that the spatial separations of the paths will cause beam 58 to impinge upon the weld region after a designated region of the workpiece receives scan light from beam 20. Telescope 64 is used in conjunction with pentahedron prism 62 to observe the alignments of both beams on the workpieces 11—11. Interlock switch 66, coupled between prism 62 and laser 56 at terminal 4 is a normally closed switch which when opened deactivates laser 56. Switch 66 is opened when a face of prism 62 is positioned in the path of laser 56 causing laser 56 to be deactivated as a precautionary measure to prevent any danger of a pulse beam from entering telescope 64 and damaging the eye of an observer during the alignment of the beam paths. A cross hair 65 in telescope 64 can be used to align the location of laser 56 so that the beam 58 is along the principal axis of lens 28 and terminates at a weld region 21 on a workpiece. Telescope 64 can also be used to position mirror 22 so that scan light beam 20 reflects off a designated region of workpiece 11 and onto the light detector 52.

To determine whether consistent weld sizes will result, the relative spot size of beam 20 is observed. A suitable gage may be used to measure the light spot size at both extremities of the workpiece plane. If the sizes differ, either the holding fixture 12 or the moveable mirror 30 is repositioned to eliminate the difference. Mirror 30 should be positioned substantially perpendicular to the position of fixture 12 to achieve consistent weld sizes.

Moveable mirror 30, a front surface mirror, is fixedly mounted to a cam follower shaft 32 at a first end. A wheel 36, acting as a cam follower, is mounted at a second end of cam follower shaft 32 and engages cam 38. Cam 38 is mechanically coupled to a scan motor 40. A coil spring 33 which bears against frame 34 and an arm 35 which extends from cam shaft 32, is used to cause cam follower 36 to follow cam 38. Attached to arm 35 is a scan position sensing switch 42 which closes after a scan has been completed. When switch 42 closes, relay 19 is energized, activating a turntable motor 16 so as to rotate a turntable 14 to position the next set of workpieces, on a succeeding holding fixture 12, along the scan path for processing. Included in the input circuit of scan motor 40 is a mode selection switch 44 which can be used to select a normal mode, an instantaneous mode, or a motor-off setting for the cam 38. A variable resistor 46 is coupled between mode selection switch 44 and the input power for regulating the speed of motor 40.

Cam 38, being shaped in parts substantially as an Archimedes' spiral curve "D", an ellipsoidal curve "E,"

and a circular curve "F", is used to control the relative motion between moveable mirror 30 and the workpieces. The cam 38 is used to program the motion of mirror 30 to be stationary when the cam follower 36 is coupled to the circular curve region "F" of cam 38; when follower 36 is coupled to the spiral region "D," mirror 30 is advanced so as to effect a scan over the workpieces; and when cam follower 36 contacts the ellipsoidal region "E," mirror 30 is retracted over the scan region to the initial point of the scan path.

The operation of apparatus 10 will now be discussed. The workpieces which may be in the form of small components, such as relays and crossbar switches, which have terminals and wires to be welded, are arranged on the holding fixture 12 such that the weld regions 21—21 are fully exposed to beam 58. Several holding fixtures may be mounted along various radii of turntable 14 as shown. The telescope 64 of beam adjustment circuit 60 is used to align the cross hair 65, the crosspoint representing the geometric center of beam 58, along the principal axis of focusing lens 28 and on the weld region 21 of a workpiece 11.

Laser 18 is activated and the normal mode of switch 44 is selected to start scan motor 40 and to cause beam path 20 to scan the workpieces 11—11. Telescope 64 is used to observe alignment of the scanning beam path relative to the workpiece plane.

Telescope 64 is also used for positioning mirror 22 so that light from beam path 20 that is reflected off a designated region, illustratively, an initial edge of wire 13, converges onto the light recepting region of light detector 52.

The beam adjustment circuit 60 is disabled by rotating prism 62 about axis 63 so that the prism is out of the path of beam 58. With prism 62 out of the beam path, switch 66 is closed and high powered pulse laser 66 is enabled and made ready to be triggered into emission.

Upon completion of the alignment of the laser paths 20 and 58, the cam 38 is moved to place the "F" region in contact with cam follower 36 by selecting the instantaneous mode circuit of switch 44. The normal scan mode is again initiated and cam 38 rotates against cam follower 36 to advance mirror 30 to cause beam 20 to scan the workpiece plane.

The light reflected off each of the plurality of workpieces 11—11 is intercepted by light detector 52 and the detected light is converted into an electrical signal that is indicative of the reflections from each workpiece. This electrical signal is coupled from the light detector 52 to the pulse signal generator circuit 54 wherein a suitable electrical output at terminal 3 is coupled to pulse laser 56 for triggering laser 56 into emission to cause a spot weld of a consistent fusion penetration and size at each weld region 21 during an uninterrupted scan of the workpieces 11—11.

Upon retraction of mirror 30 to its initial position, the circular portion "F" of cam 38 causes mirror 30 to remain stationary until motor 16 repositions turntable 14 to a new location to place another set of workpieces 11—11 in the path of the beams 20 and 58 for a repeat of the aforementioned operations for welding the next set of workpieces 11—11.

The laser weld apparatus 10 of FIG. 2 is suitable for use, for example, in automatic laser welding equipment where weld zones 21—21 are spaced in columns or rows in substantially any sequence. For example, the first workpiece may be 5 mm away from the next workpiece but 2 cm from a third. One holding fixture 12 may contain workpieces having ten weld zones 21—21 while a succeeding fixture 12 may contain workpieces having six weld zones 21—21.

Further, cam 38, for programming the movements of mirror 30, can be varied to accommodate a wide range of scan distances which would provide an even more flexible machine without any drastic structural changes.

Although the holding fixture 12 of the FIG. 2 has a surface inclined at a 45° angle so that the weld zones 21—21 on the workpiece 11—11 are exposed to the beam paths 20 and 58, it should be understood that the angle of the incline may be varied so long as mirror 30 is positioned perpendicular to the workpiece plane, so that a constant optical path is maintained between lens 28 and each workpiece as mirror 30 is advanced over the workpieces 11—11.

What is claimed is:

1. A method of beam welding a plurality of workpieces disposed along a workpiece plane, comprising the steps of:
    (a) aligning a processing beam from a processing beam source substantially along the principal axis of a focusing lens;
    (b) aligning a scan light beam substantially along the principal axis of said focusing lens;
    (c) disposing a moveable mirror between said lens and the workpiece plane and at a location along the principal axis of said lens so that the processing and scan light beams are reflected onto the workpiece plane;
    (d) translating said moveable mirror along a path coincident with the principal axis of said lens so that the processing and scan light beams are reflected onto each workpiece, the mirror being positioned with respect to the workpiece plane such that as the mirror is translated a constant optical path is maintained between said lens and each workpiece; while
    (e) positioning a light detection means to receive scan light reflected from each workpiece during the advancing of said moveable mirror over the plane for generating an electrical signal indicative of the detection of a workpiece; and
    (f) triggering said beam source into emission to weld the detected workpiece in response to said electrical signal.

2. The method of claim 1 wherein the moveable mirror is postioned perpendicular to the workpiece plane.

3. The method of claim 2 wherein the scan beam is aligned parallel to said processing beam.

4. An improved beam welding apparatus for bonding a plurality of workpieces spaced along a workpiece plane during a scan of the workpieces, including a scan light beam source; a processing beam source; a lens for focusing the processing beam to a spot on each workpiece; means for aligning the processing beam and the scan light beam substantially along the principal axis of said lens; and detection means responsive to scan light reflected off each workpiece for generating an electrical signal to trigger said processing beam source into emission, the improvement comprising:
    (a) a moveable mirror disposed between said lens and the workpieces; and
    (b) means for maintaining a constant optical path between said lens and each workpiece comprising translating means for moving said mirror coincident with said lens axis.

5. Apparatus in accordance with claim 4 wherein means (b) includes means for aligning the workpiece plane relative to said mirror such as to maintain a constant optical path between said lens and each workpiece during translations of said mirror.

6. A beam welding system for bonding a plurality of workpieces spaced along a plane during a scan of the workpieces, the optical reflectivity characteristic of the workpiece plane being different from said workpieces, comprising:
(a) a scan light source of a collimated light beam;
(b) a processing beam source for fusing said workpieces;
(c) a lens for focusing the processing beam to a spot on each workpiece;
(d) optical means for aligning both said processing beam and scan light beam substantially along the principal axis of said lens;
(e) a moveable mirror disposed between said lens and said workpieces for reflecting both said processing beam and scan light beam simultaneously onto a workpiece and for advancing both reflected beams onto each successive workpiece spaced along the plane;
(f) light detection means disposed to receive scan light reflected from each workpiece during the advancing of said moveable mirror over the plane for generating an electrical signal indicative of the detection of a workpiece for triggering said beam source into emission to weld the detected workpiece; and
(g) means for maintaining a constant optical path between said lens and each workpiece comprising translating means for moving said mirror coincident with the principal axis of said lens.

7. Apparatus in accordance with claim 6 wherein means (g) includes a mounting means having a surface aligned perpendicular to the surface of said mirror for mounting the workpiece plane.

8. Apparatus in accordance with claim 7 wherein said optical means includes a beam splitter positioned to receive both said processing beam and scan light beam for reflecting the beams along the principal axis of said lens, and wherein said scan light beam is slightly offset from said processing beam so that the light source beam impinges upon a workpiece at a time prior to the impingement of the beam.

9. Apparatus in accordance with claim 8 wherein said mirror translating means includes:
(a) a rotating cam programmed to cause said mirror to advance from an initial position along a path coincident with the lens axis to reflect both of said beams along the entire workpiece plane, to change direction so as to cause said mirror to retract along said path to the initial position, and then to remain at the said initial position for a defined period of time; and
(b) a cam follower means disposed between said cam and said mirror for coupling the programmed movements of said cam to said mirror.

10. Apparatus in accordance with claim 9 wherein said moveable mirror is positioned at a fixed angle relative to the principal axis of said lens so that the surface of said mirror remains in fixed alignment with said mounting means.

11. Apparatus in accordance with claim 10 wherein said processing beam source is a pulsed laser.

* * * * *

UNITED STATES PATENT OFFICE
CERTIFICATE OF CORRECTION

PATENT NO. : 4,125,755
DATED : November 14, 1978
INVENTOR(S) : J. M. PALMQUIST

It is certified that error appears in the above-identified patent and that said Letters Patent are hereby corrected as shown below:

In the title page "Plamquist" (both occurrences) should read --Palmquist--. Column 6, line 10, "workpiece" should read --workpieces--.

Signed and Sealed this

Thirteenth Day of March 1979

[SEAL]

Attest:

RUTH C. MASON
Attesting Officer

DONALD W. BANNER
Commissioner of Patents and Trademarks